United States Patent
Akkus et al.

(10) Patent No.: US 11,112,309 B2
(45) Date of Patent: Sep. 7, 2021

(54) DIGITAL MICROMIRROR DEVICE AND KINEMATICALLY TUNABLE WAVELENGTH FILTER-BASED IMAGING SYSTEMS

(71) Applicant: CASE WESTERN RESERVE UNIVERSITY, Cleveland, OH (US)

(72) Inventors: Ozan Akkus, Cleveland Heights, OH (US); Haithem A. B. Mustafa, Shaker Heights, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 0 days.

(21) Appl. No.: 16/754,040

(22) PCT Filed: Oct. 5, 2018

(86) PCT No.: PCT/US2018/054570
§ 371 (c)(1),
(2) Date: Apr. 6, 2020

(87) PCT Pub. No.: WO2019/071103
PCT Pub. Date: Apr. 11, 2019

(65) Prior Publication Data
US 2020/0326238 A1 Oct. 15, 2020

Related U.S. Application Data

(60) Provisional application No. 62/568,490, filed on Oct. 5, 2017.

(51) Int. Cl.
*G01J 3/44* (2006.01)
*G01J 3/02* (2006.01)
(Continued)

(52) U.S. Cl.
CPC ............... *G01J 3/44* (2013.01); *G01J 3/021* (2013.01); *G01N 21/6456* (2013.01);
(Continued)

(58) Field of Classification Search
CPC ...... G01J 3/44; G01J 3/02; G01J 3/021; G01J 2003/1221; G01N 21/64; G01N 21/65; G02B 26/0833
See application file for complete search history.

(56) References Cited

U.S. PATENT DOCUMENTS

| 5,863,504 A | 1/1999 | Heffelfinger et al. |
| 2005/0037615 A1 | 2/2005 | Cabib et al. |

(Continued)

FOREIGN PATENT DOCUMENTS

KR 20150121340 A 4/2015

*Primary Examiner* — Abdullahi Nur
(74) *Attorney, Agent, or Firm* — Hudak, Shunk & Farine Co. LPA (57) ABSTRACT

An imaging system that includes a digital micromirror device (DMD) and a tunable filter, wherein the imagining system applicable for Raman imaging, can fluorescent imaging, phosphorescent imaging, photoluminescent imaging, all of which require excitation of a specimen at a particular wavelength and analyzing the reflected light from the specimen at a wavelength that is different from the excitation wavelength, so called inelastic light scattering—ILS. A reconfigurable DMD-based inverse, spatially offset Raman spectroscopy (SORS) system is also described. Beneficially, the DMD system in the excitation path provides a uniform intensity over the sample field of view. It is also configured to prevent sample damage. Placement of a second DMD in the return path of light enables selective rejection of light in space to obtain a reconfigurable inverse SORS system that enables collection of information from different layer depths of the sample using a single detector.

18 Claims, 4 Drawing Sheets

(51) Int. Cl.
*G01N 21/64* (2006.01)
*G01N 21/65* (2006.01)
*G02B 26/08* (2006.01)
*G01J 3/12* (2006.01)

(52) U.S. Cl.
CPC ......... *G01N 21/65* (2013.01); *G02B 26/0833* (2013.01); *G01J 2003/1221* (2013.01)

(56) References Cited

U.S. PATENT DOCUMENTS

| | | |
|---|---|---|
| 2007/0262264 A1 | 11/2007 | Hasegawa et al. |
| 2010/0056928 A1 | 3/2010 | Zuzak et al. |
| 2014/0043460 A1 | 2/2014 | Hartell et al. |
| 2017/0052118 A1 | 2/2017 | Loock et al. |
| 2017/0176338 A1* | 6/2017 | Wu ........................ G01J 3/2823 |

* cited by examiner

DIGITAL MICROMIRROR DEVICE AND KINEMATICALLY TUNABLE WAVELENGTH FILTER-BASED IMAGING SYSTEMS

GOVERNMENT LICENSE RIGHTS

This invention was made with government support under Grant No. DMR-1531035 awarded by the National Science Foundation. The United States government has certain rights in the invention.

FIELD OF THE INVENTION

The present invention relates to an imaging system that includes a digital micromirror device (DMD) and a tunable filter, wherein the imaging system is applicable for Raman imaging, fluorescent imaging, phosphorescent imaging, photoluminescent imaging, all of which require excitation of a specimen at a particular wavelength and analyzing the reflected light from the specimen at a wavelength that is different from the excitation wavelength, so called inelastic light scattering—ILS. A reconfigurable DMD-based inverse, spatially offset Raman spectroscopy (SORS) system is also described. Beneficially, the DMD system in the excitation path provides a uniform intensity over the sample field of view. It is also configured to prevent sample damage. Placement of a second DMD in the return path of light enables selective rejection of light in space to obtain a reconfigurable inverse SORS system that enables collection of information from different layer depths of the sample using a single detector.

BACKGROUND OF THE INVENTION

Raman spectroscopy or imaging is a useful and powerful spectroscopic tool for chemical analysis of materials. Raman imaging relies on scattering of light, usually from a laser, preferably a monochromatic laser in the visible, near infrared, or near ultraviolet range. When the incident light utilized is monochromatic, the light reflected from the irritated area differs in wavelength from that of the light source, with the wavelength shift being utilized to determine the molecular composition of the material.

Raman spectroscopy is a fundamental tool used in materials science, biology, ceramics, pharmaceuticals, semi-conductors, energy, polymers, medicine, chemistry and physics. Raman spectroscopy can be utilized to analyze both dry (solid), gaseous and aqueous materials and requires little or no sample preparation. It provides information on the type of chemical bonds present in the analyte over a sample volume illuminated by a laser light. Included in the Raman spectrum is the information on the amount of chemical species, the macroscopic (crystallinity) and nanoscale morphology (molecular alignment) of the compound as well as its purity.

SORS method can detect signals beyond the skin barrier by spatial uncoupling of the excitation and signal collection spots. There are different ways to attain such uncoupling. However, conventional SORS techniques are limited to low sensitivity, low penetration depth, and spectral distortion. Application of excitation as ring with outer and inner diameter, and central collection point is known as invers SORS (iSORS). The inner diameter is known as the beam offset which is the distance between the excitation and the collection points. There is a strong relationship between the offset distance and the depth information profiling as it's reported in many studies. DMD will allow controls of offset distance adaptively via software configuration.

Wide-field Raman imaging can be achieved by applying a multifocal array on a sample and collecting Raman spectra with a multichannel detection scheme. The multifocal array is usually generated by a micro-lens array, a laser Tweezers, or a diffractive optical element such as liquid crystal. Multichannel detection can be accomplished by using a fiber bundle where each fiber carries a Raman spectrum to be recorded by a spectrometer. Imaging a sample containing a particle smaller than the inter-focal spacing (around 5 um required for avoiding cross-talk) of the fiber bundle is not possible. Time multiplexing technique can be used to achieve low cross talk by placing a synchronized galvomirror in front of a spectrograph entrance. Multichannel detection can be also achieved by employing a tunable wavelength filter to record Raman spectra directly on CCD at selected wavenumber. Few tunable filters that transmit 2D Raman image such as Liquid-Crystal Tunable Filter (LCTF), Acousto-optic Tunable Filter (AOTF), and Volume Bragg Tunable Filter (VBFT) have been reported. LCTF and AOTF has shown some limitations such as wide spectral bandwidth and low range tunability while VBFT has overcome these limitations by providing narrow spectral bandwidth and wide range tunability. A commercial instrument based on VBFT is available from Photon, Etc. of Montreal, Calif. for a relatively high cost (>$200K).

SUMMARY OF THE INVENTION

In view of the above, one aspect of the present invention is a new method of tunable wavelength filter that provides higher light transmission as well as sharper spectral resolution than the prior methods of wavelength filtration.

Also, in view of the above-described problems and limitations of the prior art, the present invention provides an imaging system, in particular a Raman imaging system that uses a DMD on the excitation path (referred to as DMD1 hereafter) as an adaptive diffuser to generate a laser beam with a flat-top intensity profile resulting in a uniform intensity over the sample field of view. The DMD1 is configurable to provide non-Gaussian intensity distributions in various patterns such as, but not limited to, a circle or square at a desired location of a sample. Flat-top illumination is important such that every point in the specimen is excited at a comparable, substantially same power; eliminating artifactual variations in the chemical image that are resulting from non-uniform illumination. For instance, in the standard Gaussian illumination, the intensity is higher at the center of the field of view and diminishes or decreases at or towards the edges of the sample, creating an illusion that center of the image has more species. Non-uniform illuminations as such need to be corrected after collection of the image. The present imaging systems solve this problem.

Still another embodiment of the DMD1 in terms of the benefit it offers is that it spreads the powerful laser over the sample surface by electronically resizing and/or reshaping the laser beam intensity distribution, thereby preventing damage to the sample. Different types of specimens can tolerate different intensities of laser ranging from W/mm2 to mW/mm2 that can be tuned by DMD1.

In yet a further embodiment, a wide-field Raman imaging system comprising a second DMD in the reflection path (named as DMD2 hereafter), and, a tunable wavelength filter is provided, which is very economical. In addition, utilization of DMD2 makes Raman subsurface analysis available to the user.

In a further embodiment, the system is provided with a tunable wavelength filter wherein high and low pass filters are mounted, preferably on two distinct motorized rotational stages. These two stages are individually controlled by a computer to bring the high-pass and low-pass filters very close to each other, creating a sharp band-pass filter. Computerization enables programmable control of the wavelength or range that is to be transmitted, and, the control of the full-width half maximum of the filter that allows the control of sharpness of the spectral resolution. The wavelength filter or spatial bandpass filter scheme can scan a wavelength range from 400 nm to 2000 nm by tuning the beam angle of incidence with essentially no change in spectral performance. The filter can attain spectral bandwidth, that is controllably ranging from 0.05 nm to 100 nm. Depending on the bandwidth the transmission can be as high as 90% and as low as 10%, such that, higher spectral resolution (lower full-width) results in lower transmission and vice versa.

Still another embodiment of the invention is to provide a system that enables accepting and/or rejecting the reflected light in space by using DMD2 that in turn enables collection of information from different layers of depth of the specimen using a single detector.

In one embodiment, a Raman or inelastic light scattering imaging system is disclosed, comprising: an excitation source providing a beam; a digital micromirror device arranged downstream from the excitation source in a beam path; the digital micromirror device comprising a plurality of mirrors; a spatial bandpass filter scheme with tunable wavelength and bandwidth that is positioned on a signal collection path by cross positioning of a broad high bandpass filter and a broad low bandpass filter set via a controllable rotatable stage and able to filter out a single wavenumber or multiple wavenumbers of interest to be collected by a collection device.

In a further embodiment, the digital micromirror device converts the beam from the excitation source to a square or a circular shaped flat-top beam profile having a substantially uniform intensity of light that can be distributed on the sample.

In another embodiment, a beam expander is located in the beam path between the excitation source and the digital micromirror device, and wherein a dichroic mirror is located between the digital micromirror device and a sample in the beam path wherein light reflected from the sample is able to pass through the dichroic mirror.

In yet another embodiment, the spatial bandpass filter scheme is located downstream from the sample and dichroic mirror and upstream from a charged coupled device.

In a further embodiment, the excitation source provides the single wavenumber.

In another embodiment, a flip mirror is present downstream from the tunable filter scheme and can be switched to route the beam to either the charge-couple device or a spectrometer located downstream from the flip mirror.

In still another embodiment, the beam expander increases a cross-sectional area of the beam to an area that is at least 25% larger than an area of the beam incident on the beam expander, and wherein the collection device is a 2D-charge coupled device.

In a further embodiment, the area of increase is at least 50%.

In another embodiment, a second spatial bandpass filter scheme with tunable wavelength and bandwidth is present and positioned in a signal collection path upstream from the digital micromirror device on an excitation path.

In another aspect of the invention, an inverse spatially offset Raman spectroscopy system is disclosed, comprising: an excitation source providing a beam; a digital micromirror device arranged downstream from the excitation source in a beam path; the digital micromirror device comprising a plurality of mirrors; an objective lens located downstream from the digital micromirror device that is adapted to impart an excitation area onto a sample; a second digital micromirror device or an area limiting filter located downstream in the beam path from the objective lens that only allows a Raman signal emerged from subsurface material, formed from a smaller cross-sectional area of the beam, to pass therethrough; and a spectrometer located downstream from the second DMD or the area limiting filter that analyzes the collected Raman signal.

In a further embodiment, the smaller cross-sectional area of the beam is 50 percent or less of the cross-sectional excitation area transmitted to the second digital micromirror device or the area limiting filter.

In another embodiment, the cross-sectional area is 5 to 50 percent.

In still another embodiment, the second digital micromirror device is present and reflects an annular ring of light to a barrier such that the light does not reach the spectrometer.

In a further embodiment, a collimation lens is located downstream from the excitation source and upstream from the first digital micromirror device, and wherein a bandpass filter is located between the first digital micromirror device and the dichroic mirror.

In another embodiment, a focusing lens receives a small area of the beam from the second digital micromirror device or an area limiting filter which thereafter transmits the beam to the spectrometer.

BRIEF DESCRIPTION OF THE DRAWINGS

The invention will be better understood and other features and advantages will become apparent by reading the detailed description of the invention, taken together with the drawings, wherein:

FIG. 1 illustrates (a) a schematic diagram of green laser (532 nm) wide field Raman imaging system including a DMDs and a kinematic filter, (b) images generated using Matlab algorithm to be uploaded on the DMD1's processor and (c) a square laser beam with flat-top intensity profile formed by the DMD;

FIG. 2 illustrates (a) one embodiment of an optical layout of the novel technique for detection of MSU crystals beyond the skin barrier, (b) an excitation pattern with different sizes to be focused on the sample with the ring representing the laser light, (c) collection pattern center spot and black ring represent collection area and rejected beam, respectively, (d) a green 532 nm laser is used to demonstrate the use of the DMD1 to shoot an excitation laser on metatarsal and metacarpal joints;

DETAILED DESCRIPTION OF THE INVENTION

Various systems of the present invention are described with respect to components being in a position that is either upstream or downstream of another component. The terms "upstream" and "downstream" are to be determined with respect to the optical or excitation path of a beam from the excitation source, such as a laser. For example, all other optical components of the system are considered to be downstream from the excitation source or laser.

Wide Field Raman or ILS Imaging System

One embodiment of the present invention relates to a digital micromirror device-based Raman or ILS imaging system, which is based on DMD technology and also includes a tunable filter, in particular a spatial bandpass filter scheme with tunable wavelength and bandwidth. As mentioned hereinabove, the tunable wavelength filter can scan a wavelength that ranges generally from about 400 nm to about 2,000 nm in a preferred embodiment. Even narrower ranges are used in other embodiments.

Figure 1:
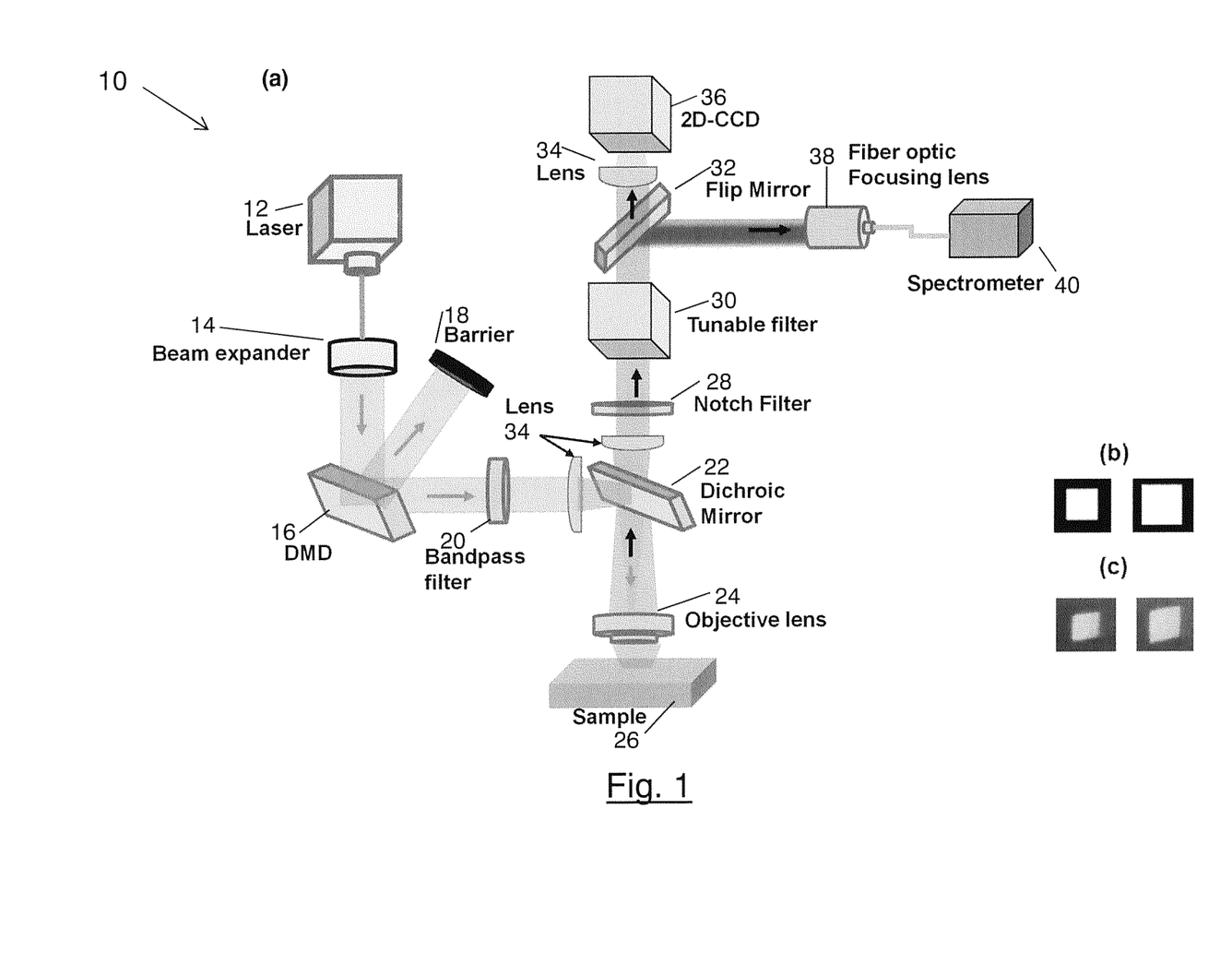

FIG. 1 (a) presents a schematic diagram of one embodiment of the ILS, in particular Raman imaging system 10 of the present invention.

As illustrated in FIG. 1(a), the system uses a powerful digital micromirror device (DMD) as an adaptive engineered diffuser to generate a laser or light beam with flat-top intensity profile result in a uniform intensity over the sample field of view. The DMD also enables controlling the excitation area over sample by electronically resizing or reshaping the laser beam intensity and diameter by generating a desired pattern intensity distributions via Matlab-based algorithm and uploading it onto the DMD processor, thus preventing sample damage. In a preferred embodiment the pattern uploaded to the DMD causes a number of mirrors to be turned to an on-state while the rest to be turned to off-state permanently or for a short time. On-state mirrors steer the beam along the excitation path while off-state mirrors steers any undesired beam away from excitation path.

The DMD is an optical micro-electrical-mechanical system that comprises an array of highly reflective micromirrors. In one embodiment the DMD provides bistable operation and allows the light to be deflected in two different positions due to the variable tilt angle between two or more micromirrors. In one particular embodiment, a first mirror can be positioned, with respect to an incident light beam, at a first angle that is different from a second angle of a second micromirror. The degree of tilt for a micromirror can vary. Relative to a flat state of a micromirror, positive and negative states of tilt are obtainable. In one embodiment, the degree of tilt ranges from 12° to −12°, relative to the flat state. During operation of the DMD in the present invention, the pixel can generally be tilted from a first position, which can be considered an "on" state wherein light is deflected downstream in a beam path towards the sample and other downstream components or in an "off" state and directed towards a light barrier or light absorber, see for example barrier 18 in FIG. 1.

Suitable DMD's include an array of a desired number of pixels, which can vary depending upon the Raman system being constructed. A software algorithm is used to generate a pattern equivalent to the desired intensity distributions acquired by the user. This pattern is basically an image where each pixel is presented by black or white color. Once the pattern uploaded on the DMD processor, each mirror will receive a digital voltage, 1 (white color) or 0 (black color) to be turned to on-state or off-state angles, respectively.

A suitable DMD is commercially available from Texas Instruments of Dallas, Tex. Suitable device parameters are as follows in some embodiments: 1920×1080 pixels (micromirrors), 7.56 um Mirror Pitch size, −/+12 degree tilt angle (relative to the flat state), visible light range 420 nm-700 nm, high-speed pattern rate via DLPC900 Controller.

Figure 4:
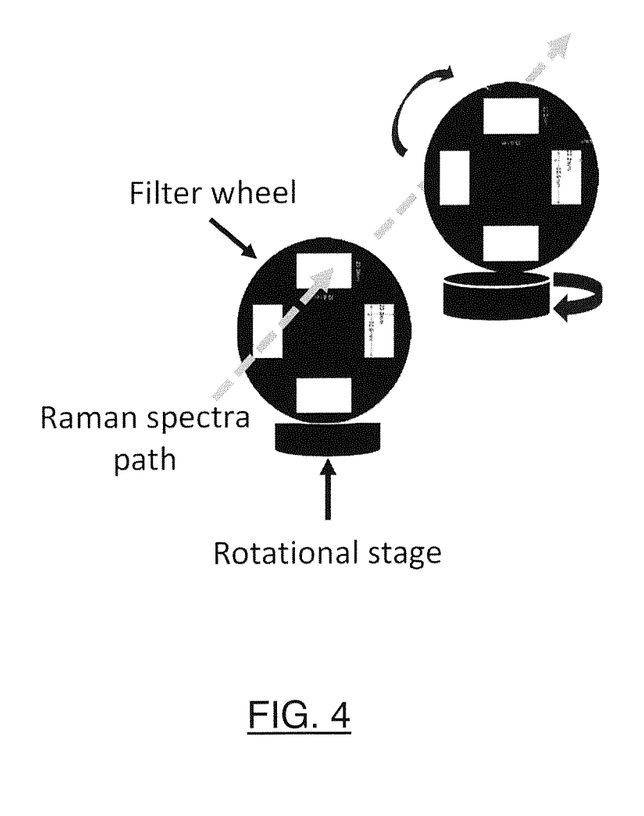
FIG. 4 illustrates a tunable filter scheme utilized in one embodiment of the present invention; wherein two filters are present and aligned in the beam path, each filter having a rotational stage and accommodating a plurality of bandpass filters.

A tunable wavelength filter system is located downstream in a beam path from the DMD and sample, see DMD 16 and sample 26 in FIG. 1 for example. FIG. 4 also shows one embodiment of a tunable wavelength filter system. This system utilizes a pair of filters in the form of a high and a low pass tunable filters.

Long and short pass tunable filters are mounted on two motorized different individually controllable rotational stages, e.g. see FIG. 4, to achieve a selective narrow bandpass filter by tuning the beam angle of incidence with essentially no change in spectral performance. In order to cover a broadband of Raman shift (up to 4500 $cm^{-1}$), two sets of multiple filters are carefully selected. One set operates as a short-pass filter, while the other operates as a long-pass tunable wavenumber filter. Each set is mounted on a motorized filter-wheel positioned on a motorized rotational stage, see FIG. 4. A software program is used to control the tunable filter scheme. At a given wavenumber, the software places the desired wheel-window along the Raman optical path, and then rotate the rotational stage to the desired position and/or angle. The software also allows the spectral bandwidth of the tunable filter to be controlled by adjusting rotational stage angle, resulting in a narrow spectral bandwidth.

A tunable filter system incorporates Semrock VersaChrome tunable filters in some embodiments. VersaChrome tunable filters are developed by Semrock and designed to combine spectral characteristics and 2D imaging performance of thin-film filters with wavelength-tuning flexibility of a diffraction grating.

The laser or light beam from the excitation source is expanded to illuminate the entire DMD active window using optical lenses. A Matlab software algorithm integrated with LabVIEW interface is used to generate a pattern of flat-top beam intensity distribution that is uploaded onto the DMD processor as we demonstrate in FIG. 1(b). The DMD then electronically steers the micro-mirrors in two different directions forming a desired beam-shape, see FIG. 1(c). The desired beam-shape will be reflected by dichroic mirror toward the sample. An objective lens focuses the beam on the sample. The reflected back Raman signal is collected via same objective lens and passes through the dichroic mirror to the tunable filter scheme. A notch filter is used to remove the Rayleigh light. The wavenumber of interest is selected by the tunable filter and then delivered to the collection device such as a 2D-CCD (charge-coupled device or camera). A spectrometer is required to validate extraction of the desired wavenumber before sending it to the CCD for imaging.

As one example of the invention, a high power laser source 532 nm (Model no. GSLR-532-2WFWA, Lasermate Group, Inc) with Gaussian output beam diameter 1.5 mm was used for samples excitation. A DMD (model no. DLP Light Crafter™ 6500, Texas Instruments) was used to generate non-Gaussian intensity distributions i.e. flat-top beam profile. Tunable long-pass (TLP) and short-pass (TSP) filters were used (part no. TLP01 & TSP01—561 nm, 628 nm, and 704 nm, Semrock, Inc.) to construct tunable filter that covered Raman shift from 100 $cm^{-1}$ to 4000 $cm^{-1}$. A 2D CCD camera (model no. DU934-BEX2-DD, Andor) was used to collect image's information. Lenses, mirrors and notch filters were purchased from Thorlabs and Chroma. Motorized stages were built.

More specifically, the system 10 includes an excitation source 12 such as a laser or a white light source and the objective lens or beam expander 14 located downstream therefrom, Depending upon the type of inelastic light scattering system, excitation can be provided by the excitation source in either only one wavelength, such as for Raman-based inelastic light scattering, or at more than one wavelength, such as when suitable for other inelastic light scattering imaging systems. Therefore, in another embodiment a white light excitation can be filtered through the spatial bandpass filter scheme to generate excitation whose wavelength can be controlled.

In still a further embodiment, the excitation source 12 can be coupled with an additional spatial bandpass filter scheme with tunable wavelength and bandwidth. The second spatial bandpass filer scheme is therefore positioned in the signal collection path prior to the digital micromirror device and arranged downstream from the excitation source and in the beam path. Using an additional spatial bandpass filter scheme upstream, along with an excitation source that provides, for example, white light, can be used to provide a desirable bandwidth that is useful for inelastic scattering methods such as fluorescent imaging, phosphorescent imaging and luminescent imaging. This scheme of putting a second filter scheme can be executed without the DMD as well.

DMD 16 receives the expanded beam and transfers the same through bandpass filter 20 which impinges upon dichroic mirror 22 and is directed past objective lens 24 onto sample 26. The beam passes again through dichroic mirror 22, through notch filter 28 and tunable filter 30 before encountering flip mirror 32. The beam is then passed from a fiber optic focusing lens 38 to spectrometer 40. Flip mirror 32 is also activated to pass the beam through lens 34 to 2D-CCD 36. Lenses 34 are also illustrated in FIG. 1 before and after dichroic mirror 22.

Barrier 18 in one embodiment is a non-reflective material, for example a black metal plate, that is used to stop light rejected by the DMD from being diffracted.

FIG. 1 (b) illustrates images generated by or using the Matlab algorithm to be uploaded on the DMD processor. FIG. 1(c) illustrates a square laser beam is generated by uploading square image (FIG. 1(b)) on the DMD processor. The generated beam is expected to show a flat-top intensity beam profile as engineered diffuser does. DMD also works as a micro-lens array to generate 2D array of laser spots, or as a conical lens (axicon) to generate a ring-shape illumination. Engineered diffusers, micro lens array, and conical lenses are passive components while DMD is adaptive optical beam shaper. The presence of DMD in the excitation path enables the system not only to switch between Raman imaging spectroscopy and Spatially off-set Raman spectroscopy (SORS) but also to have a full control over beam shape's parameters and optimization.

DMD-Based Inverse Spatially Offset Raman Spectroscopy Device

Figure 2:
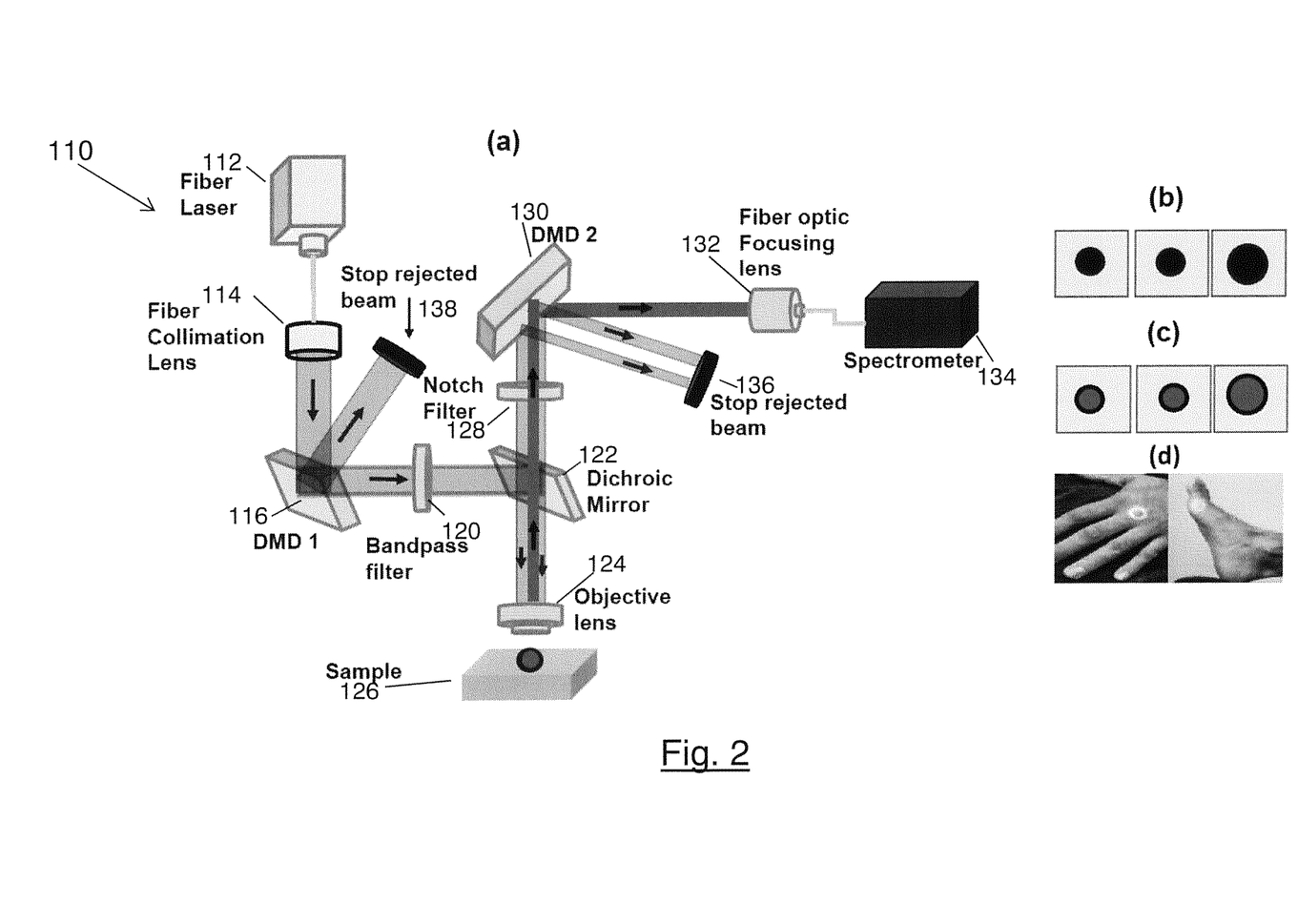

In a further embodiment of the present invention, an optical device is presented including a reconfigurable DMD-based inverse SORS, illustrated in one embodiment in FIG. 2, The system enables controlling excitation and collection parameters of different layer depths of a sample using only a single detector. The first 'excitation path' formed by the DMD is used to enhance the excitation signal by generating radially scanning multifocal ring-spots while the second DMD 'collection path' also formed by the DMD is for the collection of subsurface Raman signal from the center of the field of view.

Similar to the system described above with respect to FIG. 1, an excitation source such as laser 112 is provided. A collimation lens 114 is located downstream therefrom in order to expand the theme provided by the laser 112, A DMD 116 located downstream from the lens 114 transfers desired portions of the beam to the dichroic mirror 122 through a bandpass filter 120 located therebetween. From dichroic mirror 122 the beam passes through objective lens 124 and onto a sample 124 and is reflected back through dichroic mirror 122, notch filter 128 and onto a second DMD before being passed through a fiber optic focusing lens 132 to the detector, spectrometer 134.

Figure 3:
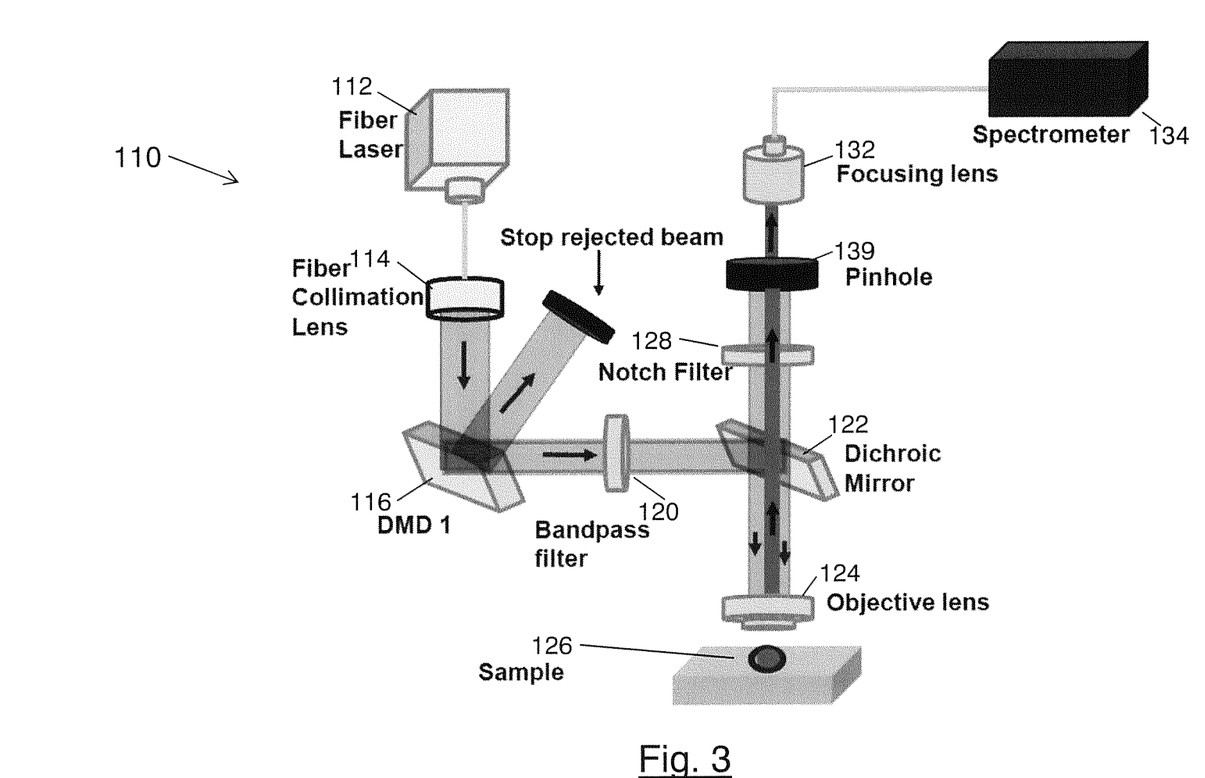
FIG. 3 illustrates DMD2 in FIG. 1(a) replaced with a pinhole filter that allows only centered light to be collected by the spectrometer.

In still another embodiment, the second DMD can be replaced with an additional pinhole or area-limiting filter 136 as illustrated in FIG. 3.

The laser beam from laser source 112 is expanded in diameter up to 5 mm from 100 um by using a fiber optic collimation lens 114. The expanded beam is delivered to a first DMD 116. A Matlab software algorithm integrated with LabVIEW interface is used to generate the 'ring-shaped' excitation to be uploaded onto the DMD processor as we demonstrate in FIG. 2 for various joints. The beam then passes through bandpass filter 120 and thereafter dichroic mirror 122. The beam is then passed through objective lens 124 onto sample 126. Excitation area can be expanded to a full range of view using an appropriate objective lens 124 (×10, Thorlabs), thus different excitation ring sizes can be implemented (FIG. 1d). As each ring is a form of a multiple spots, the spatially-offset Raman signal is multiplied compared to a single-spot excitation.

The reflected Raman signal is collected via same objective lens 124 and passed through the dichroic mirror 122 (Semrock) to the second DMD 130 for collection. The second DMD 120 rejects the ring-shaped excitation and permits precisely the collection of signal from the center of the ring. The accepted light is delivered to the spectrometer 134 (model no, HRS-VIS-025, Mightex Spectrometer) via a fiber-optic focusing lens 132. For some applications, the DMD 2 on collection path is replaced with pinhole or area limiting filter 139 that allow only centered light to pass through, see FIG. 3. Barriers 136 and 138 are also utilized in the embodiment illustrated in FIG. 2 and can be constructed and function as set forth for barrier 18 described hereinabove.

Therefore, in an important aspect of one embodiment of the invention (SORS), the system includes components designed to illuminate a sample's subsurface to be analyzed such that the beam imparts a desired excitation area, which is preferably circular or ring-shape (donut) in one embodiment. The excitation area is chosen such that it is larger (donut's thickness) than the actual area from which a collection measurement is taken (donut's center). The large area excitation (i.e. large ring) will enhance the Raman signal emerged from the sample's subsurface Light reflected from the sample is filtered to exclude a particular cross-sectional area thereof, for example an outer ring in some embodiments. That is, only a particular area of light reflected from the sample is collected and measured. Pinhole or a second DMD located before the spectrometer on the collection path will allow only Raman signal from subsurface materials to be collected by the spectrometer and reject all light reflected by the surface.

The output data is collected by a high sensitivity spectrometer via LabVIEW interface. Calibration of wavenumber and spectral response of the system is performed. Collected spectral data is corrected for dark background, shot noise and intensity modulation effect following which background correction, data smoothing, peak identification and peak intensity measurements is performed using a custom-written script in Matlab algorithm. The script algorithm is integrated in the LabVIEW platform controlling the entire system to deliver the outcome to the user.

For the avoidance of doubt, the compositions of the present invention encompass all possible combinations of the components, including various ranges of said components, disclosed herein. It is further noted that the term "comprising" does not exclude the presence of other elements. However, it is to also be understood that a description of a product or composition comprising certain components also discloses a product consisting of said components. Similarly, it is also to be understood that a description of a process comprising certain steps also discloses a process consisting of the steps.

While in accordance with the patent statutes the best mode and preferred embodiment have been set forth, the scope of the invention is not limited thereto, but rather by the scope of the attached claims.

What is claimed is:

1. A Raman or inelastic light scattering imaging system, comprising:
    an excitation source providing a beam;
    a digital micromirror device arranged downstream from the excitation source in a beam path; the digital micromirror device comprising a plurality of mirrors;
    a spatial bandpass filter scheme with tunable wavelength and bandwidth that is positioned on a signal collection path by cross positioning of a broad high bandpass filter and a broad low bandpass filter set via a controllable rotatable stage and able to filter out a single wavenumber or multiple wavenumbers of interest to be collected by a collection device;
    wherein the spatial bandpass filter scheme is located downstream from a sample and upstream from a charged coupled device; and
    wherein a flip mirror is present downstream from the spatial bandpass filter scheme and can be switched to route the beam to either the charged-coupled device or a spectrometer located downstream from the flip mirror.

2. The imaging system according to claim 1, wherein the digital micromirror device converts the beam from the excitation source to a square or a circular shaped flat-top beam profile having a substantially uniform intensity of light that can be distributed on the sample.

3. The imaging system according to claim 1, wherein a beam expander is located in the beam path between the excitation source and the digital micromirror device, and wherein a dichroic mirror is located between the digital micromirror device and a sample in the beam path wherein light reflected from the sample is able to pass through the dichroic mirror.

4. The imaging system according to claim 3, wherein the spatial bandpass filter scheme is located downstream from the sample and dichroic mirror.

5. The imaging system according to claim 4, wherein the excitation source provides the single wavenumber.

6. The imaging system according to claim 3, wherein the beam expander increases a cross-sectional area of the beam to an area that is at least 25% larger than an area of the beam incident on the beam expander, and wherein the collection device is a 2D charge coupled device.

7. The imaging system according to claim 6, wherein the area of increase is at least 50%.

8. The imaging system according to claim 1, wherein a second spatial bandpass filter scheme with tunable wavelength and bandwidth is present and positioned in a signal collection path upstream from the digital micromirror device on an excitation path.

9. An inverse spatially offset Raman spectroscopy system, comprising:
    an excitation source providing a beam;
    a digital micromirror device arranged downstream from the excitation source in a beam path; the digital micromirror device comprising a plurality of mirrors;
    an objective lens located downstream from the digital micromirror device that is adapted to impart an excitation area onto a sample;
    a second digital micromirror device or an area limiting filter located downstream in the beam path from the objective lens that only allows a Raman signal emerged from subsurface material, formed from a smaller cross-sectional area of the beam, to pass therethrough, wherein the smaller cross-sectional area of the beam is 50 percent or less of the cross-sectional excitation area transmitted to the second digital micromirror device or the area limiting filter; and
    a spectrometer located downstream from the second DMD or the area limiting filter that analyzes the collected Raman signal.

10. The inverse spatially offset Raman spectroscopy system according to claim 9, wherein the cross-sectional area is 5 to 50 percent.

11. The inverse spatially offset Raman spectroscopy system according to claim 10, wherein a focusing lens receives a small area of the beam from the second digital micromirror device or an area limiting filter which thereafter transmits the beam to the spectrometer.

12. The inverse spatially offset Raman spectroscopy system according to claim 9, wherein the second digital micromirror device is present and reflects an annular ring of light to a barrier such that the light does not reach the spectrometer.

13. The inverse spatially offset Raman spectroscopy system according to claim 9, wherein a collimation lens is located downstream from the excitation source and upstream from the first digital micromirror device, and wherein a bandpass filter is located between the first digital micromirror device and the dichroic mirror.

14. An inverse spatially offset Raman spectroscopy system, comprising:
    an excitation source providing a beam;
    a digital micromirror device arranged downstream from the excitation source in a beam path; the digital micromirror device comprising a plurality of mirrors;
    an objective lens located downstream from the digital micromirror device that is adapted to impart an excitation area onto a sample;
    a second digital micromirror device located downstream in the beam path from the objective lens that only allows a Raman signal emerged from subsurface material, formed from a smaller cross-sectional area of the beam, to pass therethrough, wherein the second digital micromirror device reflects an annular ring of light to a barrier such that the light does not reach the spectrometer; and
    a spectrometer located downstream from the second DMD that analyzes the collected Raman signal.

15. The inverse spatially offset Raman spectroscopy system according to claim 14, wherein the smaller cross-sectional area of the beam is 50 percent or less of the cross-sectional excitation area transmitted to the second digital micromirror device or the area limiting filter.

16. The inverse spatially offset Raman spectroscopy system according to claim 15, wherein the cross-sectional area is 5 to 50 percent.

17. The inverse spatially offset Raman spectroscopy system according to claim 16, wherein a focusing lens receives a small area of the beam from the second digital micromirror device or an area limiting filter which thereafter transmits the beam to the spectrometer.

18. The inverse spatially offset Raman spectroscopy system according to claim 14, wherein a collimation lens is located downstream from the excitation source and upstream from the first digital micromirror device, and wherein a bandpass filter is located between the first digital micromirror device and the dichroic mirror.

\* \* \* \* \*

UNITED STATES PATENT AND TRADEMARK OFFICE
CERTIFICATE OF CORRECTION

PATENT NO. : 11,112,309 B2
APPLICATION NO. : 16/754040
DATED : September 7, 2021
INVENTOR(S) : Ozan Akkus et al.

It is certified that error appears in the above-identified patent and that said Letters Patent is hereby corrected as shown below:

In the Claims

Column 9, Line 56, Claim 4 delete the words "sample and".

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*